United States Patent
Li et al.

(10) Patent No.: US 7,382,570 B1
(45) Date of Patent: Jun. 3, 2008

(54) DYNAMICALLY CONTROLLING SEEK PROFILE IN AN ACCELERATION TRACKING SEEK CONTROLLER

(75) Inventors: Yunfeng Li, San Jose, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 56 days.

(21) Appl. No.: 11/450,093

(22) Filed: Jun. 9, 2006

Related U.S. Application Data (60) Provisional application No. 60/749,228, filed on Dec. 9, 2005.

(51) Int. Cl.
*G11B 5/596* (2006.01)
(52) U.S. Cl. .................................. 360/78.06
(58) Field of Classification Search ............. 360/78.06, 360/75, 78.01, 78.04, 78.07, 78.08, 78.09
See application file for complete search history.

(56) References Cited

U.S. PATENT DOCUMENTS

| | | | | |
|---|---|---|---|---|
| 4,700,244 A | * | 10/1987 | Fasen et al. | 360/77.05 |
| 5,696,646 A | * | 12/1997 | Satoh | 360/78.04 |
| 6,510,019 B1 | | 1/2003 | DeRosa | 360/78.06 |
| 6,510,029 B2 | | 1/2003 | Umchara et al. | 260/318.1 |
| 6,529,456 B2 | * | 3/2003 | Koudo et al. | 369/47.48 |
| 6,597,529 B1 | | 7/2003 | DeRosa | 360/78.14 |
| 6,937,431 B2 | * | 8/2005 | Galloway | 360/78.06 |
| 2006/0158773 A1 | * | 7/2006 | Semba et al. | 360/78.06 |

* cited by examiner

*Primary Examiner*—Fred F. Tzeng
(74) *Attorney, Agent, or Firm*—Myers Bigel Sibley & Sajovec, PA (57) ABSTRACT

Methods of controlling seeking of a transducer that is adjacent to a rotatable disk in a disk drive are disclosed. The methods may include accelerating the transducer radially across the rotatable disk from an initial track on the rotatable disk toward a destination track on the rotatable disk, estimating a deceleration switching position/velocity point, estimating a maximum deceleration position/velocity point following the deceleration switching position/velocity point, and estimating a deceleration current required to decelerate the transducer from a non-zero velocity at the maximum deceleration position/velocity point to zero velocity at the destination track. The estimated deceleration current is compared to a maximum available deceleration current, and responsive to a determination that the current required to decelerate the transducer from the maximum deceleration point to the destination track exceeds the maximum available deceleration current, the estimated deceleration switching point is adjusted. Related disk drive apparatus are also disclosed.

22 Claims, 8 Drawing Sheets

DYNAMICALLY CONTROLLING SEEK PROFILE IN AN ACCELERATION TRACKING SEEK CONTROLLER

RELATED APPLICATION

This application claims the benefit of and priority to U.S. Provisional Patent Application No. 60/749,228 entitled "Switching Algorithm for Acceleration-Tracking Seek Controller," filed Dec. 9, 2005, the disclosure of which is hereby incorporated herein by reference as if set forth in its entirety.

FIELD OF THE INVENTION

The present invention generally relates to digital data storage devices and, more particularly, to methods and apparatus for seeking a transducer between tracks on a disk in a disk drive.

BACKGROUND

Disk drives are digital data storage devices that can store and retrieve large amounts of data in a fast and efficient manner. A typical disk drive includes a plurality of magnetic recording disks that are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek operation, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a selected settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, it is desirable to reduce average seek times.

As noted above, disk drives typically use current driven actuators that include voice coil motors, which respond to a current signal by accelerating or decelerating the transducer depending on the polarity of the current signal applied to the motor. The seek time may depend upon the maximum available current for acceleration and/or deceleration, which in turn may be affected by fluctuations in the voltage supply and/or the operating temperature. Variations in voltage supply and/or operating temperature may be particularly problematic for disk drives used in battery powered portable electronic devices.

SUMMARY

Some embodiments of the invention provide methods of controlling seeking of a transducer that is adjacent to a rotatable disk in a disk drive. The methods include accelerating the transducer radially across the rotatable disk from an initial track on the rotatable disk toward a destination track on the rotatable disk, estimating a deceleration switching position/velocity point, estimating a maximum deceleration position/velocity point following the deceleration switching position/velocity point, and estimating a deceleration current required to decelerate the transducer from a velocity at the maximum deceleration position/velocity point to zero velocity at the destination track. The estimated deceleration current is compared to a maximum available deceleration current, and responsive to a determination that the current required to decelerate the transducer from the maximum deceleration position/velocity point to the destination track exceeds the maximum available deceleration current, the estimated deceleration switching position/velocity point is adjusted.

The maximum deceleration position/velocity point may include a position and velocity of the transducer when a maximum deceleration current is expected to be applied.

The methods may further include determining the maximum available deceleration current. Determining the maximum available deceleration current may include determining an estimated zero-velocity maximum available control current. The maximum available deceleration current may be reduced by a quantity that may be proportional to the velocity of the transducer so as to adjust for effect of motor back-EMF on transducer movement. The maximum available deceleration current may be determined in response to a determined level of a supply voltage of the disk drive and/or a coil resistance of an actuator motor of the disk drive.

The methods may further include adjusting the estimated zero-velocity maximum available control current based on a position estimation error that is indicative of a difference between an expected transducer position and an actual transducer position.

The methods may further include generating a current command used to accelerate/decelerate the transducer while seeking based on the estimated deceleration switching position/velocity point.

The methods may further include decelerating the transducer after crossing the deceleration switching position/velocity point.

Methods according to some embodiments may include generating a current command limit based on a time remaining before the estimated deceleration switching position/velocity point responsive to a determination that the current required to decelerate the transducer from the maximum deceleration point to the destination track does not exceed the maximum available deceleration current. The methods may further include generating a current command based on the current command limit, and applying the current command to an actuator to control the acceleration of the transducer. The current command limit may be generated by multiplying the time remaining before the transducer reaches the estimated switching point by a switching gain constant. The current command may be filtered with a smoothing filter to reduce seek acoustics.

Some embodiments of the invention provide a disk drive including a data storage disk, a transducer configured to read data from the disk and/or to write data to the disk, an actuator that may be configured to position the transducer relative to the disk, and a servo controller configured to control a position and velocity of the transducer. The servo controller may be further configured to accelerate the transducer from an initial track of the data storage disk toward a destination track of the data storage disk, to estimate a deceleration switching position/velocity point, to estimate a maximum deceleration position/velocity point following the deceleration switching position/velocity point, and to estimate a deceleration current required to decelerate the transducer from a velocity at the maximum deceleration position/velocity point to zero velocity at the destination track. The servo controller may be further configured to compare the estimated deceleration current to a maximum available deceleration current, and to adjust the estimated deceleration switching position/velocity point responsive to a determination that the current required to decelerate the transducer from a non-zero velocity at the maximum deceleration point to zero velocity at the destination track exceeds the maximum available deceleration current.

The maximum deceleration position/velocity point may include a position and velocity of the transducer when a maximum deceleration current is expected to be applied. The servo controller may be further configured to determine the maximum available deceleration current. The servo controller may be further configured to determine the maximum available deceleration current by determining an estimated zero-velocity maximum available control current. The servo controller may be further configured to determine the maximum available deceleration current with reference to a supply voltage of the disk drive and/or a coil resistance of an actuator motor of the disk drive.

The servo controller may be further configured to adjust the estimated zero-velocity maximum available control current based on a position estimation error that is indicative of a difference between an actual position of the transducer and an expected position of the transducer.

The servo controller may be further configured to generate a current command based on the estimated deceleration switching position/velocity point.

The servo controller may be further configured to change the maximum available deceleration current by a quantity that is proportional to the velocity of the transducer so as to adjust for effects of motor back-EMF on transducer movement.

The servo controller may be further configured to decelerate the transducer after crossing the deceleration switching position/velocity point.

The servo controller may be further configured, responsive to a determination that the current required to decelerate the transducer from the maximum deceleration point to the destination track does not exceed the maximum available deceleration current, to generate a current command limit based on a time remaining before the estimated deceleration switching position/velocity point, to generate a current command based on the current command limit, and to apply the current command to an actuator to control the acceleration of the transducer. The servo controller may be further configured to generate the current command limit by multiplying the time remaining before the transducer reaches the estimated deceleration switching position/velocity point by a switching gain constant.

The servo controller may be further configured to filter the current command with a smoothing filter to reduce seek acoustics.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items. Similarly, a list of items separated by the symbol "/" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention may be embodied as apparatus, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
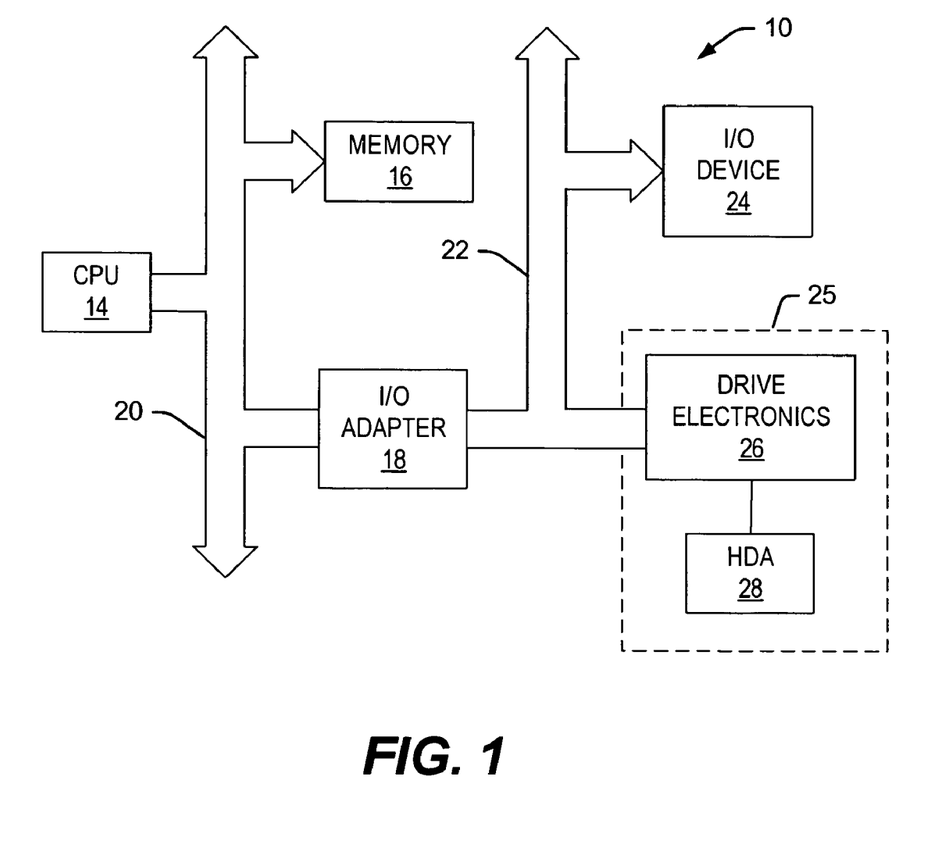
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
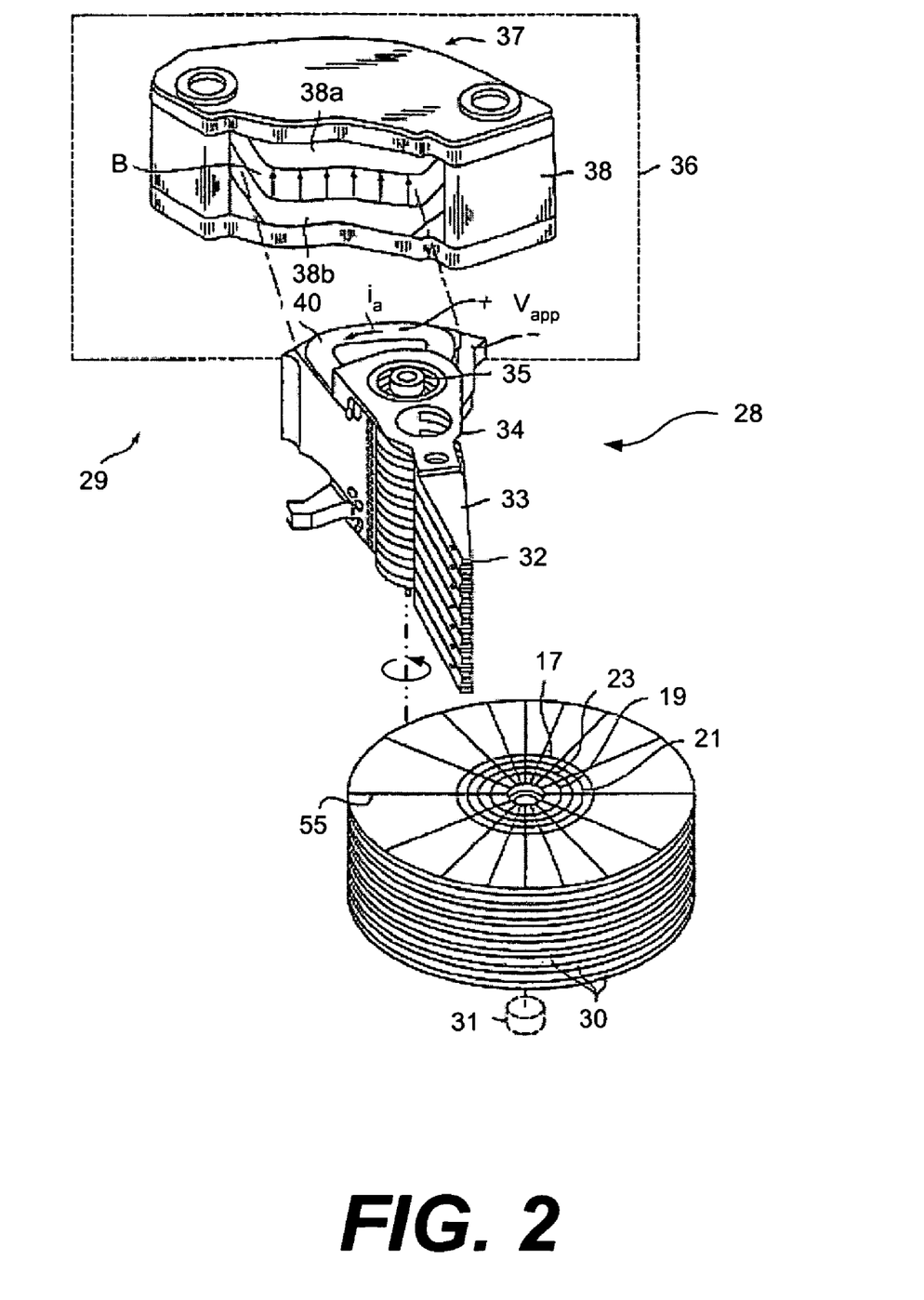
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in response to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 attached to the actuator arms 34 is disposed between the two plates 38a and 38b. The magnet 37 may generate a constant magnetic field B between the plates 38a and 38b. When the input actuator current $i_a$ is passed through the coil 40 disposed in the magnetic field B, a torque is produced on the actuator arms 34 resulting in radial motion of the arms 34 about a pivot point 35. The polarity of the input actuator current $i_a$ determines the direction of the force applied to the actuator arms 34.

Figure 3A:
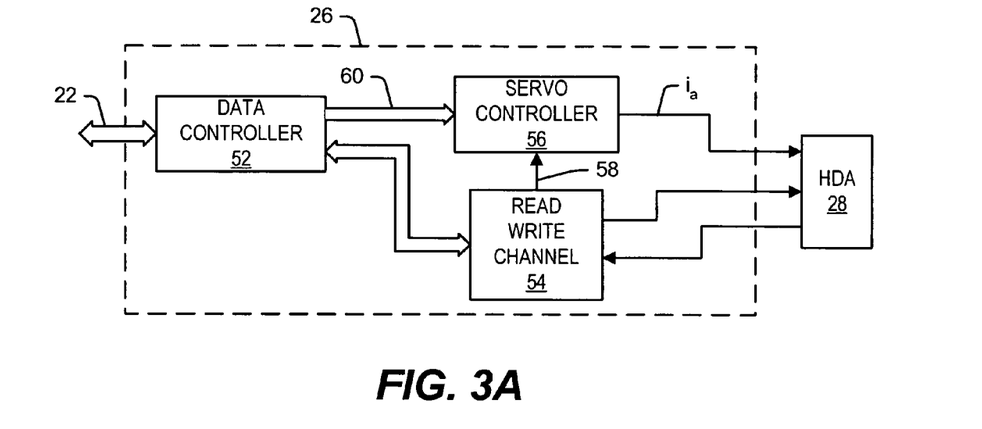
FIG. 3A is a block diagram of the drive electronics of the disk drive that is configured according to some embodiments of the present invention.

Referring to FIG. 3A, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command, which is a voltage signal that is converted into the input actuator current $i_a$, and provided to the actuator 29 to move the transducer 32 radially across the disk 30. The seek time is thus dependent on the magnitude of the current command.

Figure 3B:
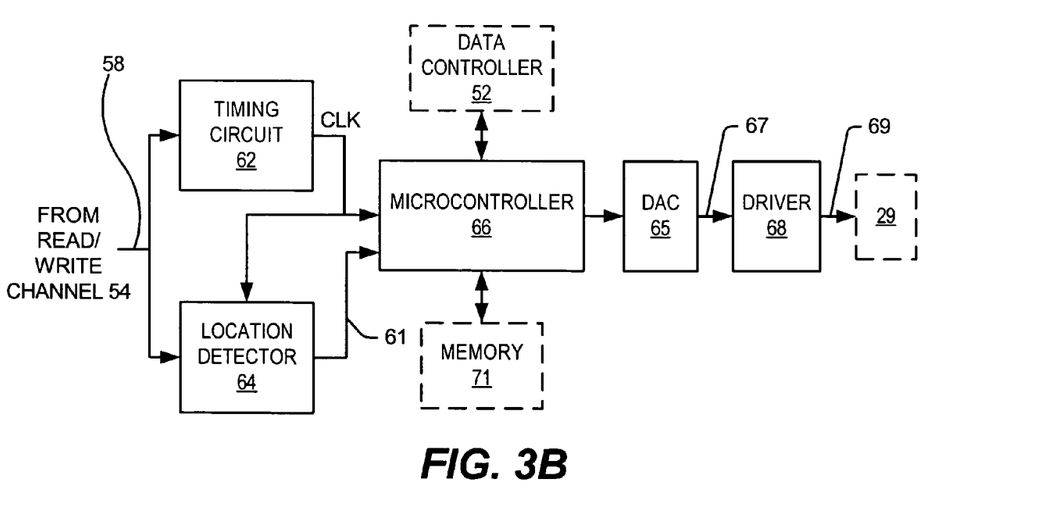
FIG. 3B is a block diagram of a servo controller configured according to some embodiments of the present invention.

The servo controller 56 is described in more detail with reference to FIG. 3B. As shown therein, the servo controller 56 can include a timing circuit 62, a location detector 64, a microcontroller 66, a digital to analog converter (DAC) 65, and a current driver 68. The timing circuit 62 can generate clock signals synchronized with the passage of servo sectors 55 on tracks under the transducer 32. The timing circuit 62 can include a counter and a phase locked loop for generating the clock signals. Based on the clock signals from the timing circuit 62 and transducer location data provided by the read/write channel 54, the location detector 64 detects a location of the transducer 32 relative to tracks 17 on the disk 30 and data blocks within the tracks 17. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The microcontroller 66 controls movement and positioning of the transducer 32 during seek operations. In response to clock signals from the timing circuit 62, where each clock signal indicates passage of a servo sector 55 under the transducer 32. The microcontroller 66 obtains the transducer location information from the location detector 64.

The microcontroller 66 then utilizes the transducer location information in conjunction with the destination track data from the data controller 52, to generate the current command for moving and/or positioning the transducer 32. The current command generated by the microcontroller 66 is provided to a driver 68 on path 67, and the driver 68 supplies the actuator current $i_a$ to the actuator 29 on path 69 in proportion to the current command, up to a maximum current supply capability of the driver 68. When the actuator current $i_a$ is applied to the motor 36, the actuator arm 34 moves radially inward or radially outward across the surface of the disk 30 to perform a seek operation.

Figure 4:
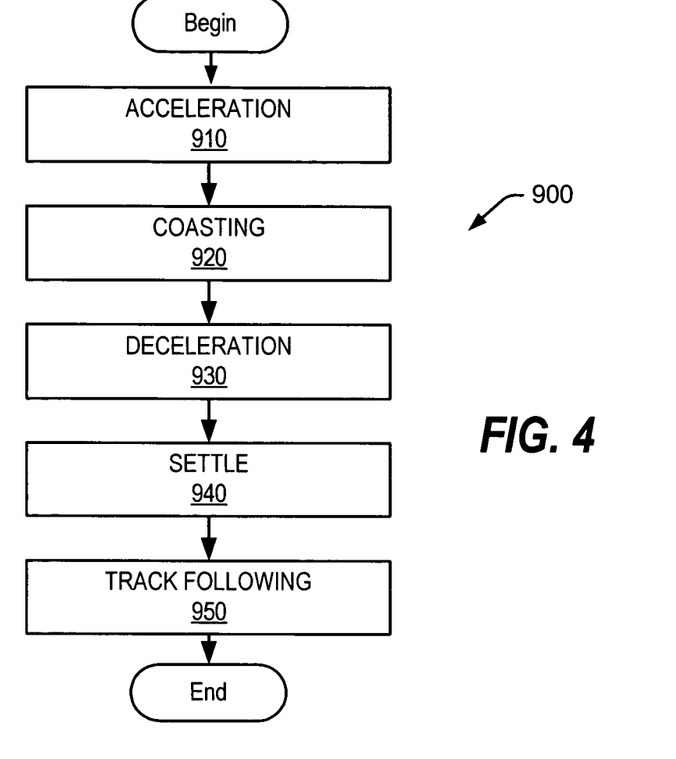
FIG. 4 is a flowchart illustrating stages of a typical seek operation of a disk drive.

Referring to FIG. 4, a seek operation 900 may include a number of stages. At the beginning of the seek operation 900, there is an acceleration stage (block 910) during which the transducer 32 is accelerated up to a maximum seek velocity. The transducer 32 is accelerated by applying a current signal having a first polarity (e.g. a positive current signal) to the coil 40 in the actuator 29. After acceleration, there may be a period during which the transducer 32 travels at a relatively constant velocity (i.e. coasts) across the surface of the disk (block 920). Very little actuator current may be required during the coasting stage of the seek. As the transducer 32 approaches the target track, the transducer is decelerated during a deceleration stage (block 930) by applying a current signal having a second polarity, opposite to the first polarity (e.g. a negative current signal) to the coil 40. In some cases, there may be no coasting stage. Rather, the seek operation may transition directly from the acceleration stage to the deceleration stage.

In order to align the transducer over the target track, the seek operation then enters a settle stage (block 940) in which the position of the transducer 32 is adjusted at a fine level until a detected position of the transducer 32 is within an acceptable distance from the center of the target track. Once the transducer 32 has settled on the target track, the servo controller 56 enters a track following stage, in which the transducer 32 is maintained above the center of the target track as the disk 30 rotates beneath the transducer 32 (block 950).

Figure 5:
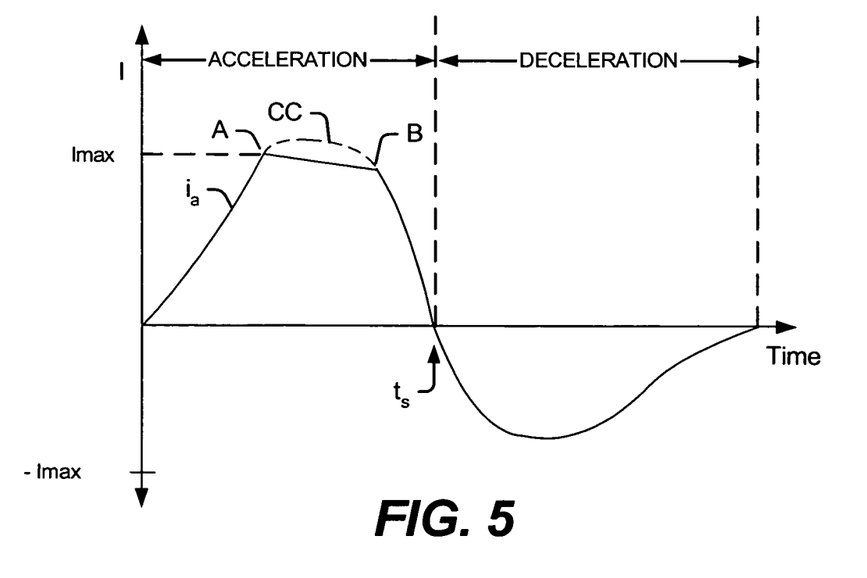
FIG. 5 is a graph of an exemplary actuator current profile for a seek operation.

Some aspects of a seek operation are illustrated in FIG. 5, which is an exemplary plot of an actuator current ($i_a$) profile and a current command (CC) profile versus time. As shown in FIG. 5, when the seek operation begins, there is an acceleration stage during which the actuator current in is increased to a maximum current level ($I_{max}$) at point A. As explained above, the maximum current may be a current at which the actuator current saturates. However, the current command (CC), which is a voltage signal applied to the current driver 68, may continue to increase even after the actuator current has reached $I_{max}$. As further illustrated in FIG. 5, after the actuator current $i_a$ has reached $I_{max}$, the actuator current $i_a$ decreases slightly in an approximately linear fashion until the current command CC decreases to the point that the actuator current $i_a$ and the current command CC converge again at point B. The reason for the slight decrease in actuator current $i_a$ between point A and point B is that as the transducer 32 is accelerated, back-EMF (electromotive force) builds up in the motor 36 and opposes the flow of the actuator current. The level of back-EMF may be modeled as a constant $k_e$ multiplied by the velocity of the transducer (v(t)). Thus, the effect of back-EMF is to reduce the actuator current as a function of time over some portions of the seek operation. As the seek operation approaches a switching point between acceleration and deceleration at time $t_s$, the actuator current is reduced, such that it becomes zero at the switching point ($t_s$). After the switching point, the transducer 32 is decelerated by a negative actuator current during the deceleration stage until the transducer 32 reaches the target track, at which point the velocity of the transducer 32 is zero.

The timing and manner in which the servo controller 56 is switched from acceleration mode to deceleration mode may play an important role in seek time and/or seek acoustics, both of which are important factors in disk drive performance. Soft-switching and acceleration-tracking seek control algorithms have been proposed to improve seek performance and/or reduce seek acoustics. See, e.g. U.S. Pat. No. 6,597,529 entitled "Method And Apparatus For Reducing Acoustic Noise In Servo-Controlled System" and U.S. Pat. No. 6,510,019, entitled "Acceleration Tracking Position Controller", the disclosures of which are incorporated herein by reference as if set forth herein. However, the methods described in these patents employ a set of seek-length dependent linear switching curves to determine the timing of switching the transducer from acceleration to deceleration modes. In contrast, some embodiments of the present invention use a single nonlinear switching-limit curve to determine an appropriate acceleration-to-deceleration switching point. Thus, some embodiments of the invention may reduce memory usage and/or simplify the seek tuning process. A switching algorithm in accordance with some embodiments of the invention may also be adaptable in real-time to changes in disk drive operating conditions, such as power supply voltage fluctuations and/or temperature changes, which may improve and/or maintain seek performance and/or reliability under changing operational conditions.

Figure 6:
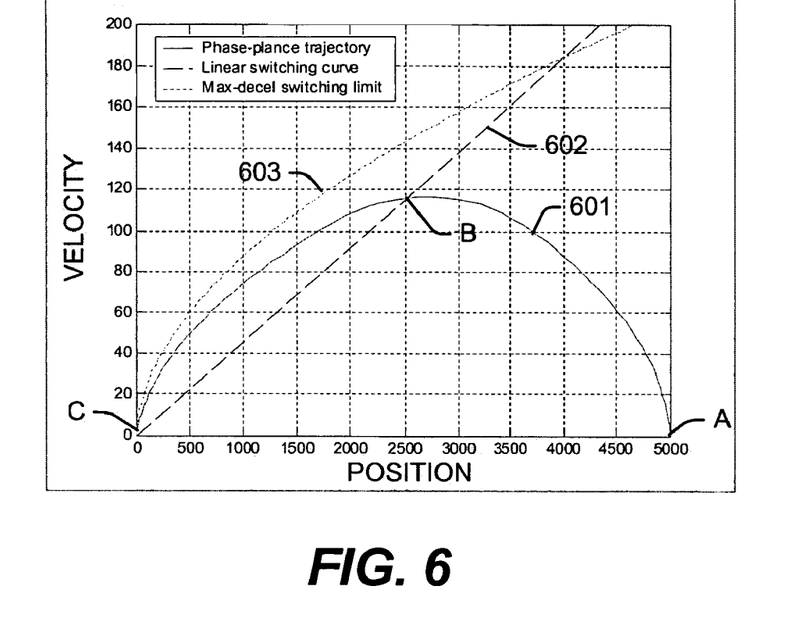
FIG. 6 is a phase-plane plot of an exemplary seek trajectory using soft-switching and acceleration-track seek control algorithms.

A linear switching curve and a switching limit curve are illustrated in FIG. 6, which is a phase-plane plot of a simulated seek operation based on the soft-switching and acceleration-track seek control algorithms described in the U.S. Pat. Nos. 6,597,529 and 6,510,029, respectively. A phase-plane plot is a plot of transducer velocity versus distance from a target location. In FIG. 6, the solid line 601 is an exemplary seek trajectory of velocity vs. position of the transducer 32. That is, the solid line represents a seek to a target track (at point C) from an initial track (at point A) that is 5000 tracks away from the target track. The linear switching curve is shown as a dashed line 602, while the switching limit curve is shown as a dotted line 603.

The transducer begins at point A, which has position/velocity coordinates of (5000,0), indicating that the transducer 32 has an initial radial velocity of zero and is initially located 5000 tracks from the target track. From point A, the transducer begins to radially accelerate towards the target track. After initially accelerating at a high rate, the acceleration rate decreases as the transducer approaches the linear switching curve 602. After the seek trajectory 601 crosses the linear switching curve 602 at point B, the transducer begins to decelerate. Deceleration continues until the transducer reaches the target track at point C, which has position/velocity coordinates of (0,0). The deceleration rate should be controlled such that the velocity of the transducer 32 reaches zero at the same time as the transducer 32 reaches the target track.

The deceleration rate is further controlled in an attempt to ensure that the seek trajectory 601 does not cross the switching limit curve 603. The switching limit curve 603 represents the trajectory for which a full deceleration (i.e. deceleration in response to a maximum applied deceleration current) results in a zero radial velocity upon arrival at the target track. Thus, if a seek trajectory crosses the switching limit curve 603, it has exceeded the maximum deceleration capability of the system. That is, for position/velocity coordinates (x(t), v(t)) to the left of the switching limit curve 603, the system cannot decelerate the transducer fast enough to bring it to rest over the target track (i.e. at position C). As a result, the transducer 32 will overshoot the target track, and additional control action will be required to bring the head back to the target position. Such control action will cause a seek delay. Even worse, the overshoot may cause the transducer head and/or actuator arm to strike a crash-stop, which may cause damage to the transducer and/or the actuator arm, as well as undesirable noise and/or vibration.

On the other hand, if the servo controller 56 switches from acceleration mode to deceleration mode too early (i.e. too far away from the switching-limit curve), it will take longer for the transducer 32 to arrive at the target track, which results in a longer seek time than necessary, and which may reduce I/O performance of the disk drive. Thus, it may be desirable to have the seek trajectory 601 approach as close as possible to the switching limit curve 603 before switching the servo controller 56 from acceleration mode to deceleration mode. In order to obtain improved performance, it may be desirable to have the deceleration control current be as close as possible to the maximum available deceleration control current.

Figure 7:
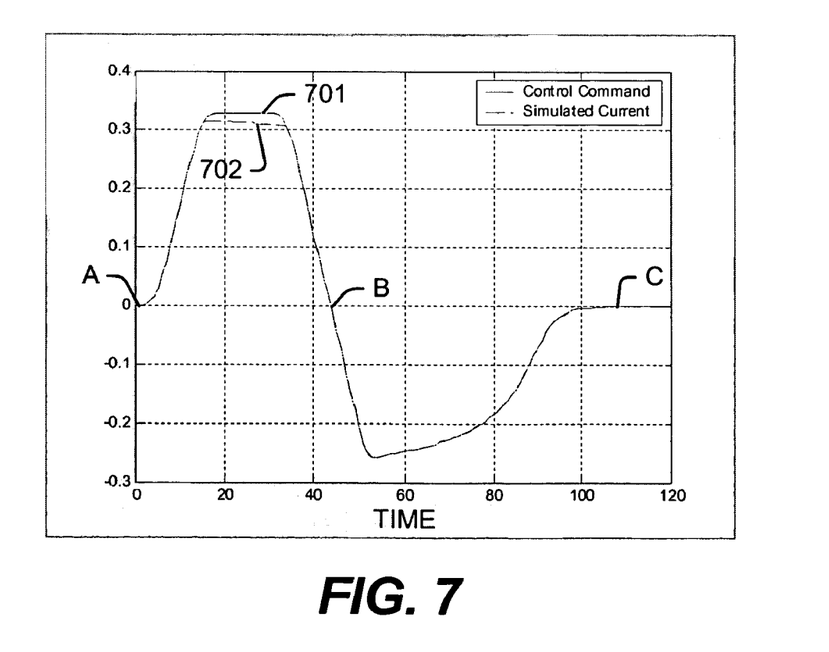
FIG. 7 is a graph of an exemplary actuator current profile for a seek operation using soft-switching and acceleration-track seek control algorithms.

FIG. 7 is a graph of a current command and resulting actuator current for a simulated seek profile based on the soft-switching and acceleration-track seek control algorithms described in the U.S. Pat. Nos. 6,597,529 and 6,510,029. As shown therein, a current command is generated by a servo microcontroller 66. The current command is shown as curve 701 in FIG. 7. The current command is applied to the current driver 68, which responsively generates an actuator current $i_a$, shown as curve 702 in FIG. 7. As shown therein, the actuator current $i_a$ starts at zero at point A and increases as the current command increases. The actuator current $i_a$ saturates at a maximum level, at which point the current command curve 701 and the actuator current curve 702 diverge. After the actuator current $i_a$ saturates, the actuator current curve 702 decreases slightly due to the back-EMF effect described above. When the current command decreases, the actuator current $i_a$ also decreases, which causes the rate of acceleration to be reduced. When the actuator current $i_a$ reaches zero at point B, the servo controller 56 may switch from acceleration mode to deceleration mode as described above in connection with FIG. 5.

For purposes of explanation, it is assumed that there is no coasting mode between acceleration and deceleration. However, it will be understood that the servo controller may enter a coasting mode following the acceleration mode once the transducer 32 has reached a maximum velocity. In that case, the servo controller 56 will switch to the deceleration mode from the coasting mode, rather that from the acceleration mode. In some aspects, the coasting mode may be viewed simply as an extension of the acceleration mode, albeit with a saturated velocity. Once the servo controller 56 switches to deceleration mode, the deceleration continues until the transducer 32 reaches the target track at point C, at which point the servo controller 56 switches to settle mode.

According to some embodiments of the invention, a single nonlinear switching-limit curve is defined for all seek lengths and is used to find the corresponding acceleration to deceleration switching point. Thus, in some embodiments of the invention, it may not be necessary to calculate, store and/or update multiple linear switching curves for multiple seek lengths. Accordingly, memory usage requirements may be reduced and/or the seek tuning process may be simplified.

Instead of basing the acceleration-to-deceleration (or coasting-to-deceleration) switching decision on crossing a predefined linear switching curve, according to some embodiments of the invention, the switching decision may be based on an acceleration-tracking control trajectory using the maximum available deceleration current. The maximum available deceleration current may be calculated taking back-EMF effects into account, and may be adapted to changes in the disk drive operating conditions/parameters. This may help to provide more consistent and/or better seek performance under different operating conditions. In particular, some embodiments of the invention may be particularly useful for disk drives used in battery-powered applications in which the power-supply voltage can experience large fluctuations.

The acceleration-track controller described in the above-referenced U.S. Pat. No. 6,510,019, which is applied during deceleration control, has the following form:

$$a(t) = -\frac{g \cdot v^2(t)}{x(t) - b_v v(t)}, \tag{1}$$

where a(t) is the desired deceleration, g is a constant which determines how the acceleration converges to zero, x(t) is the distance to the target position, v(t) is the transducer velocity, and $b_v$ is a constant related to the maximum slope of the deceleration trajectory in the phase plane. The acceleration tracking algorithm is applied after the servo controller 56 has entered the deceleration mode.

Some embodiments of the invention may employ a soft-switching algorithm such as disclosed in U.S. Pat. No. 6,597,529 to switch smoothly from acceleration to deceleration to reduce acoustic noise generated by seek operations. The switching algorithm estimates when the switch from acceleration mode to deceleration mode will occur, and applies a filtered current command limit to smooth the transition.

However, instead of using a set of linear switching curves, which are predefined for different seek lengths, some embodiments of the invention switch the servo controller 56 from acceleration mode to deceleration mode based on a relationship between the seek trajectory and the switching-limit curve. In particular, according to some embodiments of the invention, the acceleration-tracking control function is related to the maximum achievable deceleration as follows:

$$a_m(t) = -\frac{g \cdot v^2(t)}{x(t) - b_v v(t)}, \tag{2}$$

where $a_m(t)$ is the maximum achievable deceleration, which can be written as $$a_m(t) = k_a(-I_{m0} - k_b v(t)) \tag{3.1}$$

$$I_{m0} = V_{dd}/R_c \tag{3.2}$$

where $k_a$ denotes the acceleration constant, $k_b$ denotes the back-EMF constant, v(t) denotes the velocity of the transducer 32, $I_{m0}$ denotes the zero-velocity maximum available control current, $V_{dd}$ denotes the power supply voltage, and $R_c$ denotes the coil resistance of the actuator 29. Thus, according to Eq. (3.1), the maximum achievable deceleration is proportional to the maximum available control current, adjusted for back-EMF effects. Since the coil resistance $R_c$ changes with temperature, it is apparent from Eq. (3.2) that both power supply voltage fluctuation and temperature changes will affect the maximum available control current.

The zero-velocity maximum available control current $I_{m0}$ can be estimated through an adaptive process during seek operations. In the acceleration mode when a full current command is applied, the predicted saturated control current $\hat{I}_s(t)$ is given as:

$$\hat{I}_s(t) = \hat{I}_{m0} - k_b v(t) \quad (4)$$

where $\hat{I}_{m0}$ is the estimated zero-velocity maximum available control current. That is, according to Eq. 4, the estimated saturated control current is less than the zero-velocity maximum available control current by an amount that is proportional to the velocity of the transducer 32 due to back-EMF effects. The estimated zero-velocity maximum available control current $\hat{I}_{m0}$ can be adjusted at each seek based on a position estimation error, that is, the error between the measured position and a predicted position of the transducer 32 based on the plant model at the end of acceleration state, as follows:

$$\hat{I}_{m0} = \hat{I}_{m0} + \beta\epsilon \quad (5)$$

where $\epsilon$ is the estimation error and $\beta$ is the adaptation gain. By doing so, the estimated maximum available control current $\hat{I}_{m0}$ will adjust with changes in the disk drive operating conditions. The switching-limit curve defined in Eq. (2-3) will adjust accordingly. Thus, if the maximum available control current increases, the switching limit curve will shift to the left. As a result, the switching point will also shift to the left, meaning that the transducer 32 can be accelerated further before being decelerated, which may result in a shorter seek time. In contrast, methods and systems employing linear switching curves may not adjust the switching point to account for changes in operating conditions.

A switching algorithm based on the switching-limit curve defined in Eq. (2) is illustrated as operations 800 in the flowchart of FIG. 8. The operations 800 may be implemented in the servo controller 56 as part of the acceleration state control function, and may run at servo interrupts when the servo controller 56 is in the acceleration and/or coasting mode.

Figure 8:
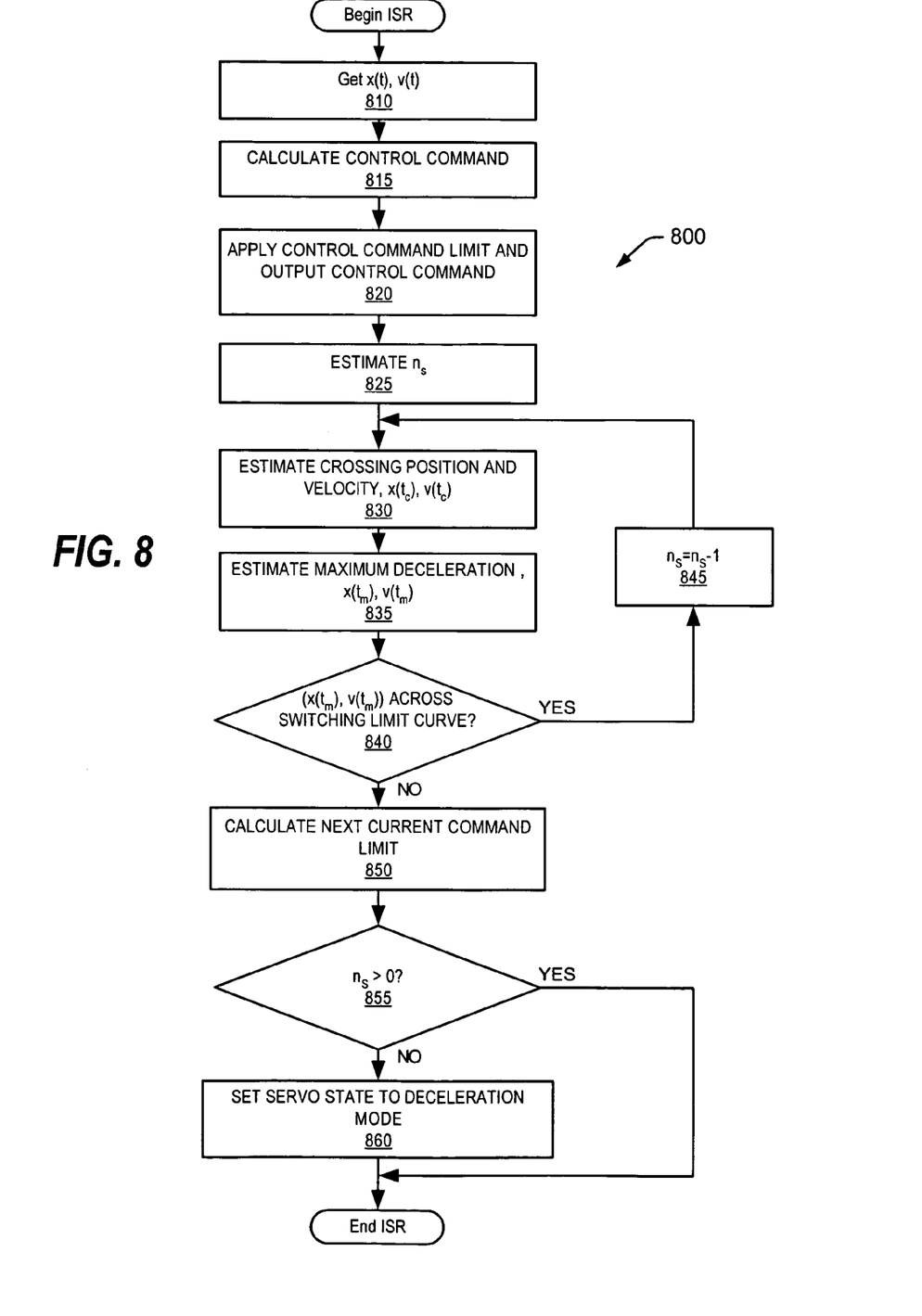
FIG. 8 is a flowchart showing operations for locating a deceleration switching position/velocity point according to some embodiments of the invention.

When the transducer 32 passes over a servo sector 55 on the surface of the disk 30, an interrupt is triggered in the servo controller 56, and an interrupt service routine (ISR) is triggered. If the servo controller 56 is in acceleration mode, operations 800 may be performed as part of the ISR. Initially, the servo controller 56 obtains the measured position x(t) of the transducer 32 from the location detector 64 and generates an estimated velocity v(t) based on the change in position of the transducer over time (block 810). The current command u(t) is then calculated based on the current position and velocity x(t) and v(t) (block 815). A current command limit $u_M(t)$ is applied to the current command u(t) before the current command u(t) is sent out to the digital-analog-converter (DAC) 65 to set the actual current command. The current command limit may restrict the current command u(t) to a predefined slew-rate limit at the beginning of the acceleration and/or a maximum limit on the magnitude of the current command. The current command limit may also be used to implement a soft-switching function, so that the current command switches gradually and smoothly from acceleration to deceleration.

The servo controller 56 then estimates $n_s$, which is the number of samples remaining until the servo controller 56 will switch from acceleration mode to deceleration mode. (block 825) The current command limit for the next sample is then set as $$u_M(t=1) = k_{sw} * n_s \quad (6)$$

where $k_{sw}$ is a pre-defined soft-switching gain. Accordingly, as the system approaches the switching point, the current command is decreased in a linear fashion with a slope based on the soft-switching gain $k_{sw}$. At the switching point, the current command limit equals zero.

According to Eq. (6), as the seek trajectory approaches the switching point, the current command limit will force the current command to gradually decrease from the maximum current command limit to zero. After the seek trajectory passes the switching point, the current command limit (which becomes a minimum limit, since the current command is negative during deceleration mode) is decreased by $k_{sw}$ at every servo ISR in which the operations 800 are executed (which for purposes of explanation is assumed to be every servo ISR during the acceleration stage), so that the deceleration current command will change gradually from zero to full deceleration.

At the beginning of the seek, an initial value of $n_s$ is set to be $$n_s = u_{MAX}/k_{sw} \quad (7)$$

where $u_{MAX}$ is the maximum possible current command. Then, the estimate of $n_s$ may be adjusted through an iterative process during every servo ISR. First, the position and velocity at the switching point, $x(t_c)$ and $v(t_c)$, are estimated as follows:

$$a(t) = \text{MIN}(u(t)*k_{DAC}, \hat{I}_{m0} - v(t)*k_e)*k_a$$

$$v(t_c) = v(t) + a(t)*n_s/2$$

$$x(t_c) = x(t) + v(t)*n_s + a(t)*n_s^2/6 \quad (8)$$

where a(t) is the estimated acceleration at the current sample, and $k_{DAC}$ is the gain from current command to current (block 830). Thus, the current acceleration is estimated taking back-EMF effects into account. Velocity at the expected switching point is estimated using the current velocity and acceleration, while position at the expected switching point is estimated using the current position, velocity, and acceleration.

Next, the position and velocity when the maximum deceleration will be applied, $x(t_m)$ and $v(t_m)$, are estimated as follows:

$$a(t_m) = -\hat{I}_{m0} - v(t)*k_e$$

$$n_m = a(t_m)/k_{DAC}/k_{sw}$$

$$v(t_m) = v(t_c) + a(t_m)*n_m/2$$

$$x(t_m) = x(t_c) + v(t_c)*n_m + a(t_m)*n_m^2/6 \quad (9)$$

where $a(t_m)$ is the estimated acceleration when maximum deceleration is applied and $n_m$ is estimated number of samples for the current command to increase from 0 to the maximum deceleration (block 835).

Next, the switching-limit curve defined in Eq. (2) is evaluated using the obtained values of $x(t_m)$, $v(t_m)$ and $a(t_m)$ to see if the required control current will exceed the estimated available control current (i.e. to see if the seek trajectory will pass the switching-limit curve), by checking the following inequality (block 840):

$$a(t_m)(x(t_m)-b_v v(t_m))+gv^2(t_m) \geq 0 \qquad (10)$$

If the expression on the left side of Eq. (10) is less than zero, then the predicted maximum current command calculated by the acceleration-tracking seek controller will be smaller than the predicted maximum available control current, which means that the seek trajectory will not pass the switching-limit curve in $n_s$ samples. In this case, $n_s$ will not change, and control will pass to block 850. However, if the expression on the left side of Eq. (10) is greater than or equal to zero, the seek trajectory will pass the switching limit curve within $n_s$ samples at the current rate of acceleration. In that case, $n_s$ is decremented (block 845), and the crossing position and velocity (block 830) and maximum deceleration point (block 850) are estimated based on the reduced value of $n_s$. The process is repeated until a value of $n_s$ is obtained for which the current trajectory will not cross the switching-limit curve.

A current command limit is then applied based on Eq. (6) for the next sample (block 850). Using this switching algorithm, the seek trajectory will approach the switching-limit curve, but not pass it. The adjusted value of $n_s$ is then checked to see if it is greater than zero (block 855). If so, the routine concludes. If $n_s$ is not greater than zero, then the system has found the switching point, and the servo control state of the servo controller 56 is set to deceleration mode (block 860). The deceleration current is then ramped up to the maximum deceleration current based on the switching gain $k_{sw}$ as described above.

The current command limit can be further filtered by a filter, such as a sine filter as described in U.S. Pat. No. 6,597,529, to make the current command smoother to reduce seek acoustics. In that case, a delay offset may be added to $n_s$ to account for the sample delay introduced by the smoothing filter. The simulation results discuss below employ such a smoothing filter.

Figure 9:
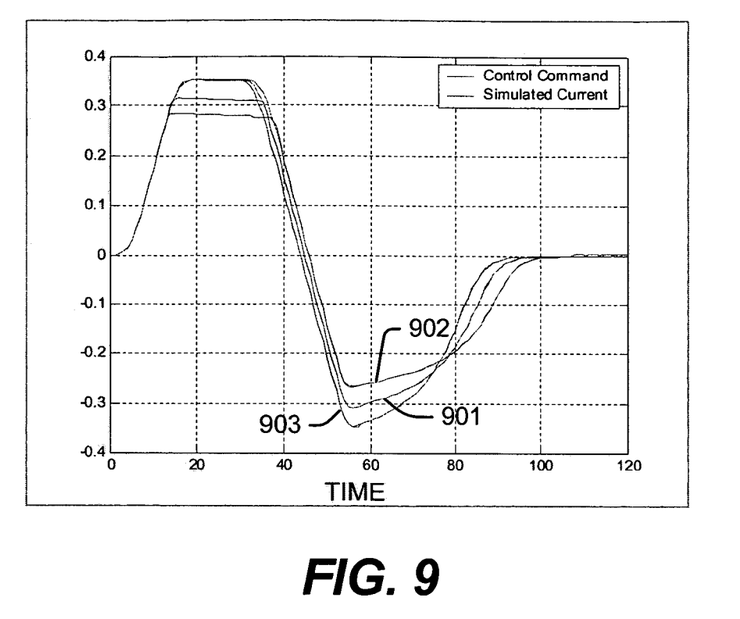
FIG. 9 is a graph of simulated actuator current profiles for seek operations according to some embodiments of the invention.
Figure 10:
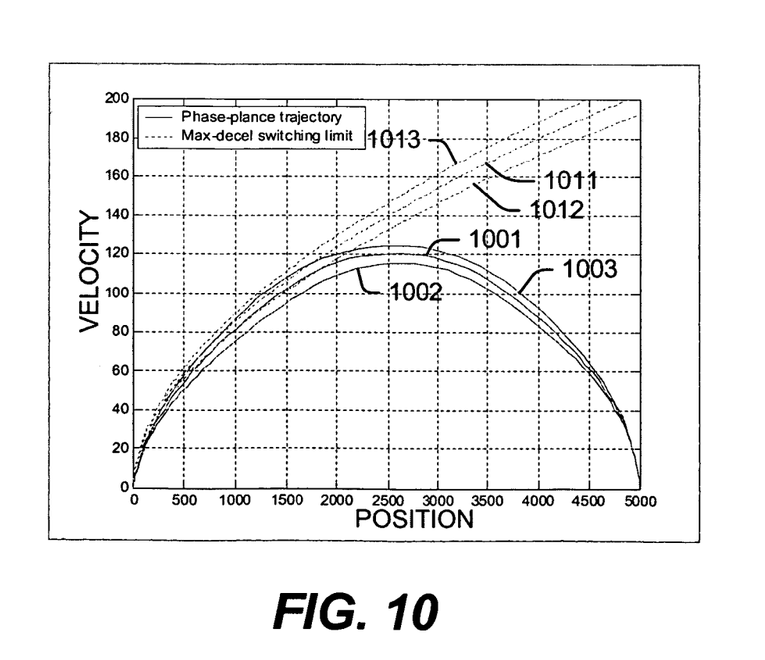
FIGS. 10 and 11 are phase-plane plots of simulated seek trajectories according to some embodiments of the invention.

The operations described above were simulated using MATLAB. FIGS. 9 and 10 show the simulation results that may be obtained using the switching algorithm described above for three different conditions, namely, for a nominal value of $V_{dd}$, as well as for $V_{dd}$ values that are ±10% from the nominal value. In FIG. 9, Curve 901 represents the simulated actuator current for the nominal value of $V_{dd}$, curve 902 represents the simulated actuator current for $V_{dd}$−10%, and curve 903 represents the simulated actuator current for $V_{dd}$+10%. In the simulation, it is assumed that $I_{m0}$ has converged to a value reflecting the change in $V_{dd}$. When there is drop in $V_{dd}$, the maximum available deceleration current $I_{m0}$ is slightly lower. Accordingly, as shown in FIG. 9, the servo control system switches to deceleration mode farther from the target track, so that the maximum deceleration current will not exceed the maximum available control current (i.e. to avoid overshoot). When there is an increase in $V_{dd}$, the maximum available deceleration current $I_{m0}$ is slightly higher. Accordingly, the servo control system switches to deceleration mode closer to the target track to take advantage of the additional available control current, and thereby reduce seek time.

In the phase-plane plot of FIG. 10, curve 1001 represents the simulated transducer trajectory for the nominal value of $V_{dd}$, curve 1002 represents the simulated transducer trajectory for $V_{dd}$−10%, and curve 1003 represents the simulated transducer trajectory for $V_{dd}$+10%. Curve 1011 represents the switching limit curve for the nominal value of $V_{dd}$, curve 1012 represents the switching limit curve for $V_{dd}$−10%, and curve 1013 represents the switching limit curve for $V_{dd}$+10%. As shown in FIG. 10, the switching limit curve 1013 for $V_{dd}$+10% is shifted to the left from the switching limit curve 1011 for the nominal $V_{dd}$, indicating that the maximum available deceleration current may be applied closer to the target track, while the switching limit curve 1012 for $V_{dd}$−10% is shifted to the right, indicating that the maximum available deceleration current must be applied farther from the target track compared to the curve 1011 for the nominal $V_{dd}$.

Figure 11:
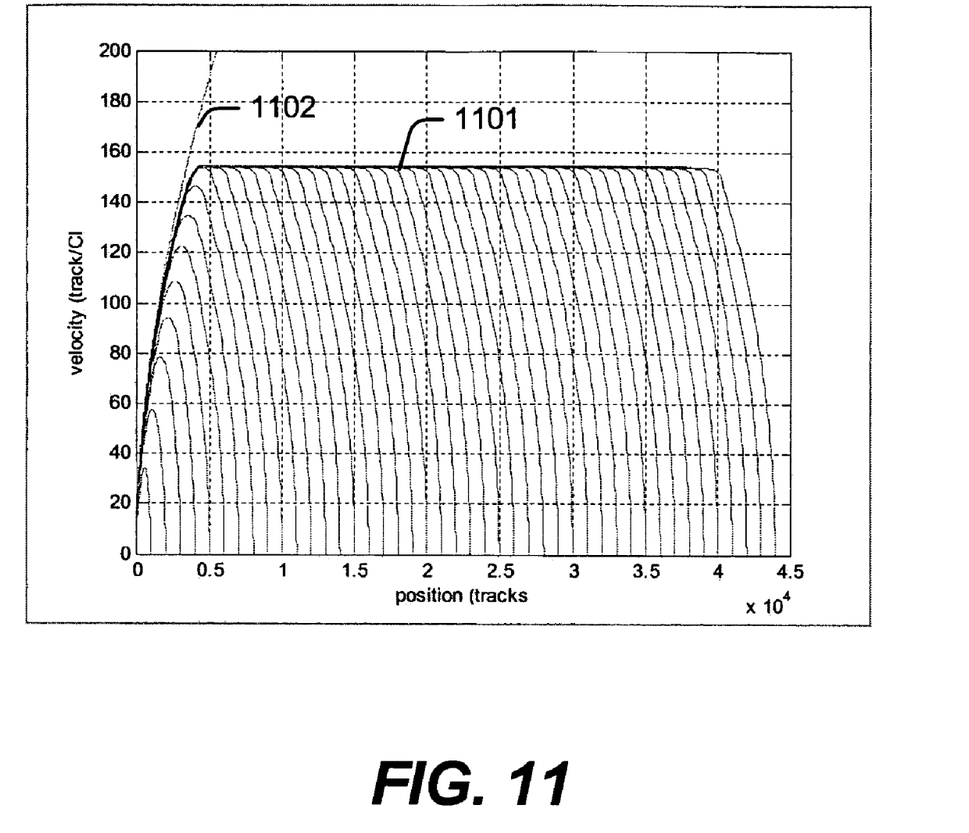

FIG. 11 shows a family of simulated seek trajectories 1101 in the phase plane for different seek lengths. Curve 1102 is the switching-limit curve that is used to calculate seek trajectories for each of the different seek lengths. Since the switching-limit curve 1102 is defined by the maximum available control current, a single switching-limit curve may be used for all seek lengths.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling seeking of a transducer that is adjacent to a rotatable disk in a disk drive, the method comprising:

accelerating the transducer radially across the rotatable disk from an initial track on the rotatable disk toward a destination track on the rotatable disk;

estimating a deceleration switching position/velocity point;

estimating a maximum deceleration position/velocity point following the deceleration switching position/velocity point;

estimating a deceleration current required to decelerate the transducer from a non-zero velocity at the maximum deceleration position/velocity point to zero velocity at the destination track;

comparing the estimated deceleration current to a maximum available deceleration current; and responsive to a determination that the current required to decelerate the transducer from the maximum deceleration position/velocity point to the destination track exceeds the maximum available deceleration current, adjusting the estimated deceleration switching position/velocity point.

2. The method of claim 1, wherein the maximum deceleration position/velocity point comprises a position and velocity of the transducer when a maximum deceleration current is expected to be applied.

3. The method of claim 1, further comprising determining an estimated zero-velocity maximum available control current.

4. The method of claim 3, further comprising:

adjusting the estimated zero-velocity maximum available control current based on a position estimation error that is indicative of a difference between an expected position and an actual position of the transducer.

5. The method of claim 1, further comprising determining the maximum available deceleration current in response to a determined level of a supply voltage of the disk drive and/or a coil resistance of an actuator motor of the disk drive.

6. The method of claim 1, further comprising generating a current command used to accelerate/decelerate the transducer while seeking based on the estimated deceleration switching position/velocity point.

7. The method of claim 1, wherein the maximum available deceleration current is changed by a quantity that is proportional to the velocity of the transducer so as to adjust for an effect of motor back-EMF on transducer movement.

8. The method of claim 1, further comprising decelerating the transducer after crossing the deceleration switching position/velocity point.

9. The method of claim 1, further comprising:
responsive to a determination that the current required to decelerate the transducer from the maximum deceleration point to the destination track does not exceed the maximum available deceleration current, generating a current command limit based on a time remaining before the estimated deceleration switching position/velocity point;
generating a current command based on the current command limit; and
applying the current command to an actuator to control the acceleration of the transducer.

10. The method of claim 9, wherein the current command limit is generated by multiplying the time remaining before the transducer reaches the estimated switching point by a switching gain constant.

11. The method of claim 9, wherein the current command is filtered with a smoothing filter to reduce seek acoustics.

12. A disk drive comprising
a data storage disk;
a transducer configured to read data from the disk and/or to write data to the disk;
an actuator that is configured to position the transducer relative to the disk; and
a servo controller configured to control a position and velocity of the transducer, wherein the servo controller is further configured to accelerate the transducer from an initial track of the data storage disk toward a destination track of the data storage disk, to estimate a deceleration switching position/velocity point, to estimate a maximum deceleration position/velocity point following the deceleration switching position/velocity point, to estimate a deceleration current required to decelerate the transducer from a non-zero velocity at the maximum deceleration position/velocity point to zero velocity at the destination track, to compare the estimated deceleration current to a maximum available deceleration current, and to adjust the estimated deceleration switching position/velocity point responsive to a determination that the current required to decelerate the transducer from a non-zero velocity at the maximum deceleration point to zero velocity at the destination track exceeds the maximum available deceleration current.

13. The disk drive of claim 12, wherein the maximum deceleration position/velocity point comprises a position and velocity of the transducer when a maximum deceleration current is expected to be applied.

14. The disk drive of claim 12, wherein the servo controller is further configured to determine the maximum available deceleration current by determining an estimated zero-velocity maximum available control current.

15. The disk drive of claim 14, wherein the servo controller is further configured to adjust the estimated zero-velocity maximum available control current based on a position estimation error that is indicative of a difference between an expected position of the transducer and an actual position of the transducer.

16. The disk drive of claim 14, wherein the servo controller is further configured to determine the maximum available deceleration current in response to a determined level of a supply voltage of the disk drive and/or a coil resistance of an actuator motor of the disk drive.

17. The disk drive of claim 12, wherein the servo controller is further configured to generate a current command based on the estimated deceleration switching position/velocity point.

18. The disk drive of claim 12, wherein the servo controller is further configured to change the maximum available deceleration current by a quantity that is proportional to the velocity of the transducer so as to adjust for effects of actuator back-EMF on transducer movement.

19. The disk drive of claim 12, wherein the servo controller is further configured to decelerate the transducer after crossing the deceleration switching position/velocity point.

20. The disk drive of claim 12, wherein the servo controller is further configured, responsive to a determination that the current required to decelerate the transducer from the maximum deceleration point to the destination track does not exceed the maximum available deceleration current, to generate a current command limit based on a time remaining before the estimated deceleration switching position/velocity point; to generate a current command based on the current command limit; and to apply the current command to an actuator to control the acceleration of the transducer.

21. The disk drive of claim 20, wherein the servo controller is further configured to generate the current command limit by multiplying the time remaining before the transducer reaches the estimated switching point by a switching gain constant.

22. The disk drive of claim 20, wherein the servo controller is further configured to filter the current command with a smoothing filter to reduce seek acoustics.

* * * * *

UNITED STATES PATENT AND TRADEMARK OFFICE
CERTIFICATE OF CORRECTION

PATENT NO. : 7,382,570 B1  
APPLICATION NO. : 11/450093  
DATED : June 3, 2008  
INVENTOR(S) : Li et al.

It is certified that error appears in the above-identified patent and that said Letters Patent is hereby corrected as shown below:

Column 12, Line 12: Please correct "$u_M (t=1) = k_{sw} * n_s$"
To read -- $u_M (t+1) = k_{sw} * n_s$ --

Signed and Sealed this

Twelfth Day of August, 2008

JON W. DUDAS  
*Director of the United States Patent and Trademark Office*